United States Patent [19]

Kirchlechner et al.

[11] 3,882,124
[45] May 6, 1975

[54] 3-(5-OXYPHENETHYL)-GLUTARIMIDES

[75] Inventors: Richard Kirchlechner; Werner Rogalski; Jürgen Seubert, all of Darmstadt, Germany

[73] Assignee: Merck Patent Gesellschaft mit beschrankter Haftung, Darmstadt, Germany

[22] Filed: Aug. 18, 1972

[21] Appl. No.: 281,652

[30] Foreign Application Priority Data
Aug. 21, 1971 Germany.................... 2141946

[52] U.S. Cl............ 260/281; 260/146; 260/240 R; 260/290 HL; 260/290 R; 260/307; 260/465 D; 260/465 G; 260/465 K; 260/468 K; 260/521 R; 260/468 L; 260/588 R; 260/559 AT; 260/566 A; 260/586 R; 260/591; 424/256
[51] Int. Cl............................................ C07d 29/20
[58] Field of Search..................... 260/281

[56] References Cited
UNITED STATES PATENTS
| | | | |
|---|---|---|---|
| 3,391,144 | 7/1968 | Johnson............. | 260/281 |
| 3,502,660 | 3/1970 | Butler et al......... | 260/559 AT |
| 3,509,184 | 4/1970 | Conover et al..... | 260/559 AT |
| 3,515,731 | 6/1970 | Conover............. | 260/559 AT |

*Primary Examiner*—Donald G. Daus
*Assistant Examiner*—Mary C. Vaughn
*Attorney, Agent, or Firm*—Millen, Raptes & White

[57] ABSTRACT

Glutaric acid imides of the general formula

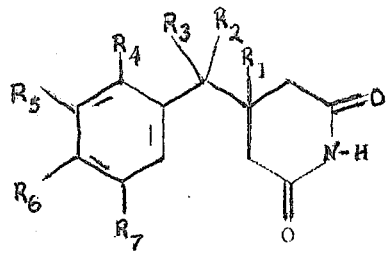

wherein $R_1$, $R_2$, and $R_3$ are H or alkyl or alkoxy of up to 6 carbon atoms, respectively, $R_4$, $R_5$, and $R_6$ are H, halogen, OH or functionally modified OH, $NO_2$, COOH, $COOR_8$, $CF_3$, alkyl, alkenyl, or alkinyl of respectively up to 4 carbon atoms, amino, alkylamino, or dialkylamino of up to 8 carbon atoms, or acylamino of up to 7 carbon atoms, or two of $R_4$ and $R_5$ or $R_5$ and $R_6$ are —CH=CH—CH=CH—, $R_7$ is free, esterified or etherified OH, and $R_8$ is alkyl of up to 6 carbon atoms, including the salts and quaternary ammonium compounds thereof, are valuable intermediates in the production of tetracyclines.

13 Claims, No Drawings

3-(5-OXYPHENETHYL)-GLUTARIMIDES

BACKGROUND OF THE INVENTION

This invention relates to novel glutaric acid imides.

SUMMARY OF THE INVENTION

The compounds of this invention are glutaric acid imides of the general Formula I

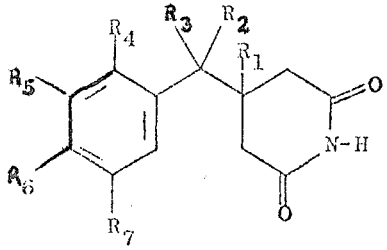

wherein $R_1$, $R_2$, and $R_3$, which can be alike or different, are H or alkyl or alkoxyl of up to 6 carbon atoms, respectively; $R_4$, $R_5$, and $R_6$, which can be alike or different, are H, halogen, preferably F, Cl or Br, are OH functionally modified OH, $NO_2$, COOH, $COOR_8$, $CF_3$, or alkyl, alkenyl or alkinyl of respectively, up to 4 carbon atoms, amino, monoamino or dialkylamino of up to 8 carbon atoms, or acylamino of up to 7 carbon atoms, and $R_7$ is OH or etherified or esterified OH; and $R_8$ is alkyl of up to 6 carbon atoms; which compounds are valuable intermediates in the preparation of tetracyclines.

In its process aspect, this invention relates to a process for the preparation of glutaric acid imides of general Formula I, and the salts and quaternary ammonium compounds thereof, which comprises:

a. reacting a compound of the general Formula II

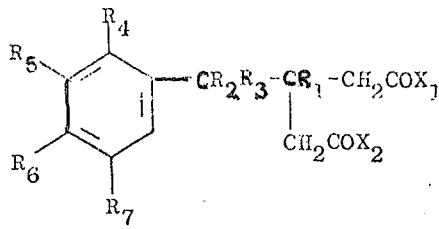

wherein $X_1$ and $X_2$, which can be alike or different, are OH, halogen, preferably Cl or Br, $NH_2$, $OR_8$, $OCOR_8$ or collectively O; and $R_1$ through $R_8$ have the above values given with ammonia or ammonia-evolving agents and/or with agents splitting off $HX_1$ or $HX_2$, respectively; or b. reacting a compound of the general Formula III

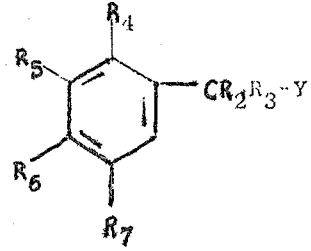

wherein Y is an equivalent of a metallic atom, preferably an alkali metal atom or MgZ, in which Z is Cl, Br or I, and $R_2$ through $R_7$ have the values given above, with a compound of the general Formula IV

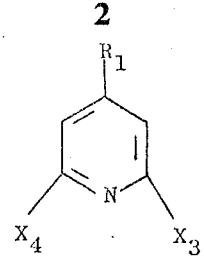

wherein $X_3$ and $X_4$, which can be alike or different, are halogen, preferably Cl or Br, or $OR_8$ and $R_1$ and $R_8$ have the values given above; or c. exchanging, by reaction with an aqueous medium, the diazonium group for an OH group in a compound of Formula V

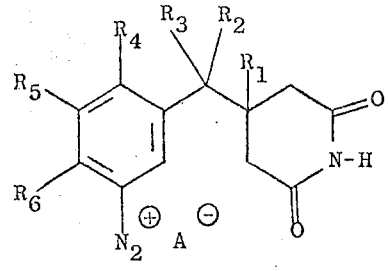

wherein A is Z or $HSO_4$ and Z and $R_1$ through $R_6$ have the values given above; or d. reacting a compound of the general Formula VI

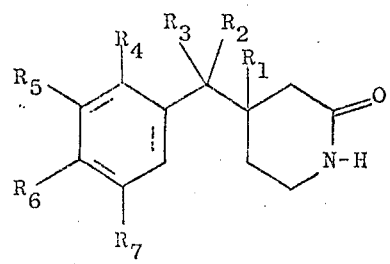

wherein $R_1$ through $R_7$ have the values given above, with an oxidizing agent; or e. reacting a compound of Formula VII

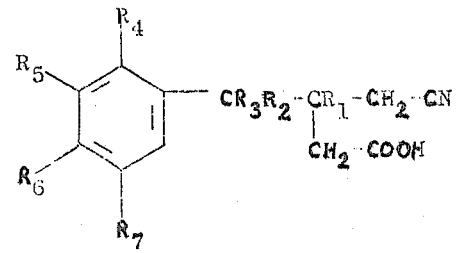

wherein $R_1$ through $R_7$ have the values given above, with a cyclizing agent; or f. reacting a compound otherwise corresponding to Formula I, but containing, in place of a hydrogen atom, a reducible group and/or a group replaceable by a hydrogen atom, e.g., a halogen atom, preferably Cl, Br or I, a carbonyl oxygen, or a benzyl group and/or a C—C double or triple bond, with a reducing, preferably a hydrogen-evolving agent; and, optionally, thereafter, converting, in a thus-obtained compound of Formula I, one of $R_1$ to $R_7$ into another $R_1$ to $R_7$ of a different value; and/or optionally converting a compound of the general Formula I into a salt thereof by treatment with an acid or base or liberating a compound of Formula I from a salt thereof by treatment with a base or acid.

In a method of use aspect, this invention relates to the use of compounds of general Formula I for the preparation of tetracyclines.

DETAILED DISCUSSION

Of glutaric acid amides of the general Formula I, preferred are those of the free bases, especially those wherein $R_1$ is H, methyl, ethyl or propyl, especially H or $CH_3$, one of $R_2$ and $R_3$ is H and the other is H or methyl, at least one and preferably two of $R_4$, $R_5$, $R_6$ and $R_7$ are H and the others are H, $CH_3$, $OCH_3$; F, Cl, Br, $NO_2$, $NH_2$, $CH_3NH$ or $(CH_3)_2N$, at least one thereof, especially $R_7$, preferably being H or $OCH_3$. Especially preferred are those of Formula I$a$ through I$f$ wherein except as indicated, $R_1$ through $R_7$ have the values given above:

I$a$    $R_1$ = H;
I$b$    $R_1$ = $CH_3$;
I$c$    $R_7$ = OH, $OCH_3$ or $OCH_2C_6H_5$;
I$d$    $R_1$ = H; $R_7$ = OH, $OCH_3$ or $OCH_2C_6H_5$;
I$e$    $R_1$ = $CH_3$; $R_7$ = OH, $OCH_3$ or $OCH_2C_6H_5$;
I$f$    $R_1$ = H; $R_4$ = $OCH_3$; $R_7$ = OH, $OCH_3$ or $OCH_2C_6H_5$.

Included within the compounds of Formula I are the salts and quaternary ammonium compounds thereof.

The salts are especially addition salts of compounds of Formula I containing at least one amino group with organic or inorganic acids. Inorganic acids, such as sulfuric acid, nitric acid, hydrohalic acids, e.g., hydrochloric acid and hydrobromic acid, and phosphoric acids, e.g., orthophosphoric acid are preferred but organic acids, for example, aliphatic, alicyclic, araliphatic, aromatic and heterocyclic, mono- or polybasic carboxylic or sulfonic acids, e.g., formic acid, acetic acid, propionic acid, diethylacetic acid, succinic acid, fumaric acid, lactic acid, aminocarboxylic acids, sulfamic acid, benzoic acid, nicotinic acid, methanesulfonic acid, p-toluenesulfonic acid are suitable, too.

Quaternary ammonium compounds are the trialkylammonium derivatives of the compounds of Formula I. Preferably the three alkylgroups are equal and contain up to 4 carbon atoms. Especially prefered are the trimethyl- and the triethylammonium derivatives.

The above mentioned salts and quarternary ammonium compounds can be utilized for synthesizing tetracyclines as shown below in the same manner as the free compounds themselves.

Among the tetracycline syntheses described in the literature, those which promise an economical production of the tetracyclines lead via the tetralone acetaldehydes of general Formula VIII (T = CHO) as the key stages

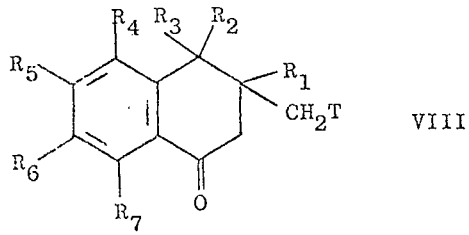
VIII wherein $R_1$ through $R_7$ have the values given above and T is CHO, COOH or $CONH_2$.

In the literature, several processes are described for the preparation of these aldehydes. Thus, for example, the aldehyde VIIIa (T = CHO; $R_1$, $R_2$, $R_3$, $R_4$ and $R_6$ = H; $R_5$, $R_7$, $OCH_3$) was produced by a nine-stage synthesis from 3,5-dimethoxybenzyl bromide with a total yield of 9.8% (D. R. White, Dissertation, 1966, University of Wisconsin, Madison. The aldehyde VIII$b$ (T = CHO; $R_1$, $R_2$, $R_3$, $R_5$ and $R_6$ = H; $R_4$ = chlorine; $R_7$ = $OCH_3$) was likewise prepared in accordance with a nine-stage synthesis (J. Amer. Chem. Soc. 87, 933 [1965]).

The aldehydes of the general Formula VIII (T = CHO), and thus tetracyclines, can be prepared in a particularly advantageous manner from glutarimides of the general Formula I, since glutarimides of general Formula I can be reacted, for example by treatment with cyclizing agents, preferably in the presence of a Friedel-Crafts catalyst, to amides of the general Formula VIII (T = $CONH_2$) which can then be converted, in accordance with conventional methods, into the aldehydes of general Formula VIII (T = CHO).

However, under suitable conditions, for example with sulfuric acid as the cyclizing agent, Formula I can be cyclized to acids of Formula VIII (T = COOH) and then these acids can be converted by conventional methods into aldehydes of Formula VIII (T = CHO).

Preferably, $R_1$, $R_2$ and $R_3$ are, in addition to H, unbranched alkyl of up to 6 carbon atoms or unbranched alkoxyl of up to 6 carbon atoms, preferably of up to 4 carbon atoms, e.g., methyl, ethyl, n-propyl, n-butyl, n-pentyl or n-hexyl; methoxy, ethoxy, n-propoxy, n-butoxy. These groups can also be, for example, isopropyl, isopropoxy, isobutyl, isobutoxy, sec.-butyl, sec.-butoxy, tert.-butyl, tert.-butoxy, n-pentoxy, isopentyl, isopentoxy, n-hexoxy, isohexyl and isohexoxy.

Functionally modified OH groups are, in particular, etherified or esterified OH groups. Preferred etherified groups are alkoxy groups of up to 6 carbon atoms. Others which are equivalent, benzyloxy, tetrahydropyranyloxy and tetrahydrofuryloxy groups. Examples of ester groups are acyloxy whose acyl radical is that of an inorganic acid, e.g., sulfuric or phosphoric acid, or preferably an organic, carboxylic or sulfonic acid, especially those of up to 18 carbon atoms.

Suitable carboxylic acids of preferably 1–18 carbon atoms are, for example, alkanoic or fatty acids, e.g., acetic acid, propionic acid, butyric acid, valeric acid, isovaleric acid, trimethylacetic acid, caprylic acid, palmitic acid and undecylenic acid. Equivalent esters are esters of carbocyclic aryl acids, preferably having 1-2 separate or fused rings, e.g., benzoic acid and naphthoic acid, cycloaliphatic, preferably monocyclic containing 5-6 ring carbon rings, e.g., hexahydrobenzoic acid, cycloalkylalkanoic acids, e.g., cyclopentyl- and cyclohexyl- acetic and -propionic acids, arylalkanoic acids, e.g., phenylacetic acid and phenylpropionic acid, and substituted acids, e.g., halocarboxylic acids, such as chloroacetic acid, ether acids, e.g., phenooxyacetic acid, and heterocyclic carboxylic acids, e.g., of 1-2 separate or fused 5–6 member rings containing, e.g., a N, O or S atom as a ring member, e.g., 2-furancarboxylic acid or nicotinic acid. Also suitable are dicarboxylic acids of preferably 2–18 carbon atoms, e.g., succinic acid, and amino- and alkylaminocarboxylic acids, e.g., glycine and N-methylglycine.

When $R_4$, $R_5$ and/or $R_6$ are amino or mono- or dialkylated amino groups of up to 8 carbon atoms, preferred such groups include, in $NH_2$, the methyl-, dimethyl-, ethyl-, diethyl-, n-propyl-, di-n-propyl-, isopropyl-, n-butyl-, di-n-butyl-, n-hexyl-, n-octyl-, tetramethylene-, pentamethylene- and hexamethyleneamino.

When $R_4$, $R_5$ or $R_6$ is an acylamino of up to 7 carbon atoms preferred are those wherein the acyl group is that of an acid named above which contain up to 7 carbon atoms, especially the alkanoic acids.

$R_4$, $R_5$ and $R_6$ can also be branched or unbranched alkyl, e.g., methyl, ethyl, propyl, isopropyl, butyl, isobutyl, sec.-butyl, or tert.-butyl; alkenyl, such as vinyl, allyl, 1-propenyl, isopropenyl,1-butenyl-(1), 1-butenyl-(2), 1-butenyl-(3), 1-butenyl-(4), 2-butenyl-(1), 2-butenyl-(2), 2-methyl-1-propenyl-(1), 2-methyl-1-propenyl-(3), allenyl, 1,3-butandienyl-(1), or 1,3-butadienyl-(2); and alkinyl, such as ethinyl, 1-propinyl-(1), 1-propinyl-(3), 1-butinyl-(1), 1-butinyl-(3), 1-butinyl-(4), or 2-butinyl-(1).

$R_7$, in addition to OH, can also be alkoxy or an acyloxy. $R_7$ preferably is methoxy or benzyloxy. However, $R_7$ can be other alkoxyl group of up to 6 carbon atoms, or tetrahydropyranyloxy or tetrahydrofuryloxy, for example. When $R_7$ is an esterified OH group, the acyl radical thereof preferably is that one of the above-named acids.

$X_1$ and $X_2$ can be identical or different and can be OH, halogen, i.e., fluorine or iodine, or preferably chlorine or bromine, $NH_2$, $OR_8$, i.e., alkoxy as defined above, $OCOR_8$, i.e., acyloxy as defined above, or collectively O.

$R_8$ is alkyl of up to 6 carbon atoms, preferably methyl, ethyl, n-propyl, n-butyl, n-pentyl, or n-hexyl or, less preferably, for example, isopropyl, isobutyl, sec.-butyl, tert.-butyl, isopentyl, isopentyl, pent-2-yl, pent-3-yl, tert.-pentyl, neopentyl, hex-2-yl, hex-3-yl or isohexyl.

Y is an equivalent of a metallic atom, preferably an alkali metal atom, e.g., Li, Na or K. However, an equivalent of an alkaline earth metal atom is also suitable, for example. In particular, Y is a magnesium halide grouping of the formula MgZ, wherein Z is chlorine, bromine, or iodine.

$X_3$ and $X_4$ are preferably identical and are halogen, preferably chlorine or bromine, or $OR_8$, $R_8$ being alkyl as defined above.

The compounds of general Formula II are substituted 3-benzylglutaric acids and functional acid derivatives thereof. Preferred are the 3-benzylglutaric acids and/or 3-benzyl-3-methylglutaric acids substituted in the aromatic ring by alkoxy groups or halogen atoms and their functional derivatives.

The compounds of Formula III are organometallic benzyl compounds preferably substituted in the benzene ring by alkoxy and/or halogen. The corresponding benzyllithium compounds and/or the corresponding benzylmagnesium chlorides or bromides are preferred.

The compounds of Formula IV are pyridine derivatives containing, in the 2- and 6-positions, a halogen atom, preferably Cl or Br, or an alkoxy group. Preferred are 2,6-dichloropyridine, 2,6-dibromopyridine, 2,6-diethoxypyridine, 2-chloro-6-ethoxypyridine, 2-bromo-6-ethoxypyridine, 2,6-dichloro-4-methylpyridine,2,6-dibromo-4-methylpyridine, 2,6-diethoxy-4-methylpyridine and 2-bromo-6-ethoxy-4-methylpyridine.

The compounds of Formula V differ from the compounds of Formula I only in that they contain, in place of $R_7$, a diazonium group; the residues $R_1$ through $R_6$ have the values given above.

The compounds of Formula VI are substituted 3-benzyl-5-valerolactams, $R_1$ through $R_7$ having the values given above. They differ from the compounds of Formula I only in that one CO group in the heterocyclic ring is replaced by a $CH_2$ group.

The compounds of general Formula VII are substituted glutaric acid mononitriles, preferably substituted 3-benzyl-glutaric acid mononitriles or substituted 3-benzyl-3-methylglutaric acid mononitriles.

The compounds of general Formula II are obtained, for example, by the reaction of a functional acid derivative of acetone-dicarboxylic acid with a compound of Formula III, dehydration of the thus-obtained 3-hydroxy-3-benzylglutaric acid derivative, hydrogenation of the double bond, and optionally splitting off the masking groups. The two last-mentioned reaction steps can, of course, also be conducted in reverse order.

The use of acetonedicarboxylic acid derivatives is especially advantageous when the two carboxyl groups are present in the form of 4,5-dihydro-1,3-oxazole residues or as a di-tert.-butyl ester. Preferably, the compounds are employed in the form of their bis-(4,4-dimethyl-4,5-dihydro-1,3-oxazole) derivatives. They are obtained, for example, by reacting the anhydrous dicarboxylic acids having a blocked keto group with 2-amino-2-methylpropanol, preferably by boiling in an inert organic solvent, e.g., benzene, toluene or xylene and azeotropic removal of the thus-formed water.

The reaction of a compound of Formula III with an acetonedicarboxylic acid derivative is conducted according to conventional methods. Preferably, the conditions of a Grignard reaction are utilized, in the presence of a solvent, especially an ether, such as diethyl ether, tetrahydrofuran, dioxane or ethylene glycol dimethyl ether. Other inert solvents, e.g., benzene or toluene, can also be added. Preferably, ether solutions of the compounds of Formula III are added dropwise to a solution of the functional acetonedicarboxylic acid derivative. The reaction temperatures range between $-10°$ and $+120°$ C., and preferably are the boiling temperature of the solvent. In order to eliminate side reactions to a maximum extent, the reaction is preferably conducted under an inert gas atmosphere, preferably $N_2$ or $H_2$.

The dehydration of the thus-obtained 3-hydroxy-3-benzylglutaric acid derivatives is accomplished by treatment with acidic catalysts, for example, a strong inorganic acid, e.g., $H_2SO_4$, HCl, $H_3PO_4$, $BF_3$, or organic acid, e.g., $CF_3COOH$, $CCl_3COOH$, $CH_3SO_3H$, p—$CH_3$—$C_6H_4$—$SO_3H$, or $HOCH_2CH_2SO_3H$, or an acidic salt, e.g., $KHSO_4$. The dehydration sometimes takes place during the working up of the reaction mixture. However, it is also possible to heat the thus-obtained 3-hydroxy-3-benzylglutaric acids and/or the functional derivatives thereof in an inert solvent in the presence of an acidic catalyst.

The addition of hydrogen to the double bond can be attained either by catalytic hydrogenation or with the aid of a chemical reducing agent. Examples for suitable catalysts for catalytic hydrogenations are noble metal, nickel and cobalt catalysts, as well as copper-chromium oxide. The noble metal catalysts can be utilized on supports, e.g., palladium on charcoal, calcium carbonate or strontium carbonate, as an oxide catalyst, e.g., platinum oxide, or as a finely divided metal catalyst. Nickel and cobalt catalysts are suitably used as Raney metals, and nickel also on kieselguhr or pumice as support. The hydrogenation can be conducted at room temperature and under normal pressure or at an elevated temperature and/or elevated pressure. Preferably, a pressure of from 1 to 100 atmospheres is employed, and a temperature of from $-80°$ to $+150°$ C. is utilized. The reaction is suitably effected in the presence of a solvent, e.g., water, methanol, ethanol, isopropanol, tert.-butanol, ethyl acetate, tetrahydrofuran or acetic acid. For purposes of hydrogenation, the free acids or the functionally modified acid derivatives can be employed. The conditions of the hydrogenation must be selected so that the remaining reducible groups and/or systems present in the molecule, for example the aromatic ring or the carboxyl groups, are not likewise attacked. Therefore, the reaction is preferably conducted under normal pressure in such a manner that the hydrogenation is terminated after absorption of the stoichiometric quantity of hydrogen.

The hydrogenation of the double bond can also be accomplished by reaction with nascent hydrogen. The latter can be produced, for example, by treating metals with acids or bases. Thus, it is possible to utilize, e.g., a mixture of zinc with acid or an alkaline solution, of iron with hydrochloric acid or acetic acid, or tin with hydrochloric acid. The use of sodium or another alkali metal in a lower alcohol, e.g., ethanol, isopropanol, or butanol, is likewise feasible.

Furthermore, an aluminum-nickel alloy in an alkaline-aqueous solution, optionally with the addition of ethanol, can also be employed. Likewise, sodium amalgam or aluminum amalgam in an aqueous-alcoholic or aqueous solution is suitable for the generation of nascent hydrogen. The reaction can also be effected in a heterogeneous phase, it being advantageous to use an aqueous phase and a benzene or toluene phase. The reaction temperatures employed range from room temperature to the boiling point of the selected solvent.

The starting compounds of Formula II are also obtained by the Michael addition of malonic esters to compounds of Formula IX

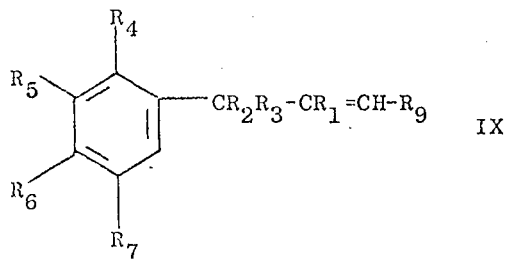

wherein $R_9$ is CN or $COOR_8$ and $R_1$ through $R_8$ have the values given above, saponification of the ester group and optionally of the nitrile group, and decarboxylation, for example by boiling in aqueous acid.

It is also possible to react a nitro compound of Formula X

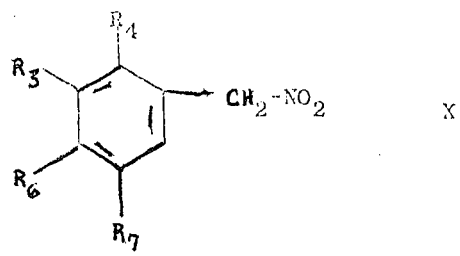

wherein $R_4$ through $R_7$ have the values given above, in a basecatalyzed, aldol-type condensation, with acetone dicarboxylic acid esters to produce substituted 3-($\alpha$-nitrobenzylidene)-glutaric acid diesters and convert the latter, by treatment with a base metal in the presence of an acid, for example, with Zn and HCl, into substituted 3-benzoylglutaric acid diesters, from which, in turn, the starting compounds of Formula II ($R_1 = R_2 = R_3 = H$) can be produced by treatment with a reducing agent, preferably a hydrogen-evolving agent.

It is also possible to react substituted benzoylacetic acid esters with malonic ester by the Knoevenagel in the presence of a secondary amine, and to hydrogenate the thus-obtained unsaturated tricarboxylic acid esters, saponify the ester groups, and convert the saponification product by acidification and decarboxylation into starting compounds of Formula II ($R_1$, $R_2$ and $R_3 = H$).

A further possibility is reacting a benzene derivative of Formula XI

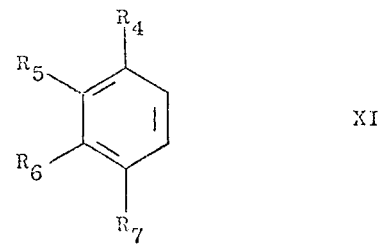

wherein $R_4$ through $R_7$ have the values given above, with succinic anhydride in the presence of a Freidel-Crafts catalyst, preferably in an inert organic solvent, e.g., $CS_2$, $CH_2Cl_2$ or nitrobenzene; condensing the thus-obtained 4-aryl-4-oxobutyric acid with glyoxylic acid; and converting the thus-produced 3-aroyl-glutaconic acid, for example by treatment with zinc in glacial acetic acid, into a starting compound of Formula II ($R_1$, $R_2$ and $R_3 = H$). It is also feasible to selectively hydrogenate the C-C double bond of the 3-aroyl-glutaconic acids and to convert the thus-obtained 3-aroyl-glutaric acids in accordance with known methods into bis(4,5-dihydro-1,3-oxaxolyl) derivatives thereof and then converting these derivatives by reaction with an alkyl-Grignard compound, dehydration, hydrogenation, and splitting off the masking groups, into starting compounds of Formula II ($R_1$ and $R_3 = H$; $R_2 = $ alkyl).

It is likewise possible to react glutaconic acid diesters with compounds of Formula III, preferably in the presence of a Cu(I) compound, e.g., $Cu_2Z_2$, especially $Cu_2I_2$, followed by hydrolysis of the adduct formed primarily by 1,4-addition to obtain a compound of Formula II.

It is likewise possible to react a compound of Formula XII

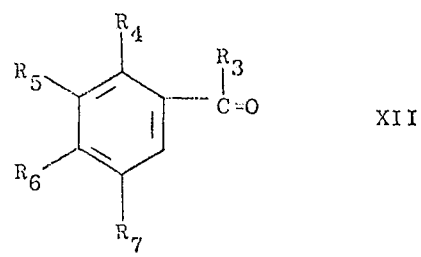

wherin $R_3$ through $R_7$ have values given above with a compound of Formula XIII

Q—CH$_2$—CHY—CH$_2$—Q     XIII wherein Y has the values given above and Q is

or —COO-tert.—$C_4H_9$ and followed by dehydration, hydrogenation same and saponification of the reaction product to a compound of Formula II ($X_1$, $X_2 = $ OH).

A further method for the production of the starting compounds of Formula II resides in the condensation of a compound of Formula XII with a malonic ester by the Knoevenagel reaction, hydrogenation of the double bond of the condensation product according to known methods, and reduction of the thus-produced saturated diester with a complex metal hydride, e.g., LiAlH$_4$, optionally followed by esterification of one or both OH groups or conversion to halogen groups to produce compounds of the general Formula XIV ($R_{10}$, $R_{11}$ = OH):

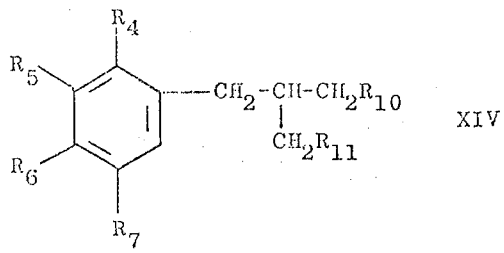

wherein $R_{10}$ and $R_{11}$, being identical or different, are Z or free or esterified OH, and $R_4$ through $R_7$ and Z have the values given above.

Dialcohols of Formula XIV ($R_{10}$, $R_{11}$ = OH) can be converted into the halogen derivatives of Formula XIV ($R_{10}$, $R_{11}$ = Z) with a halogenating agent, e.g., PCl$_3$, PBr$_3$, PI$_3$, POCl$_3$, POBr$_3$, PCl$_5$, SOCl$_2$, SOBr$_2$, SO$_2$Cl$_2$, SO$_2$Br$_2$, or, for example, into the corresponding sulfonic acid esters of Formula XIV ($R_{10}$ = $R_{11}$ = esterified OH) with sulfonic acid halogenides, such as CH$_3$SO$_3$Cl, p–CH$_3$–C$_6$H$_4$–SO$_2$Cl, $\alpha$-C$_{10}$H$_7$SO$_2$Cl or $\beta$-C$_{10}$H$_7$SO$_2$Cl.

From compounds of Formula XIV the corresponding substituted glutaric dinitriles are obtained, for example, by reaction with an alkali cyanide, e.g., KCN. From these glutaric dinitriles, the starting compounds of Formula II ($R_1$, $R_2$, $R_3$ = H) can then be produced by saponification and acidification.

Compounds of Formula XIV can also be obtained in a conventional manner by reacting compounds of Formula XV with a malonic ester, preferably in the presence of an alkali alcoholate, and reduction of the thus-obtained diester with a complex metal hydride, e.g., LiAlH$_4$, and further processing of the thus-obtained dihydroxy compounds of Formula XIV ($R_{10}$, $R_{11}$ = OH) as described above.

Compounds of general Formula III are obtained in accordance with methods described in the literature, for example, by reacting a benzyl halogenide of the general Formula XV

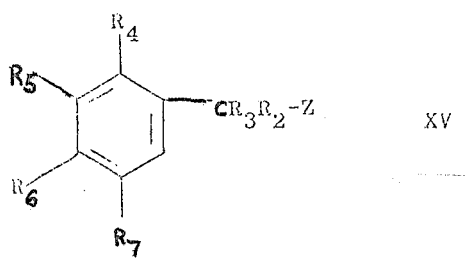

wherein $R_2$ through $R_7$ and Z have the values given above, with metallic magnesium, preferably magnesium filings, particularly in the presence of an anhydrous organic solvent in which the thus-formed Grignard compound of Formula III (Y = MgZ) is dissolved. In general, the reaction conditions customary for Grignard reactions are utilized, as disclosed above and described in greater detail in the literature.

The benzyllithium compounds (Y = Li) of Formula III are preferably produced from the corresponding benzyl halogenides of Formula XV by reaction with an organolithium compound, e.g., butyllithium or phenyllithium, preferably in an inert solvent, e.g., an aliphatic or cycloaliphatic hydrocarbon, e.g., hexane, heptane, isooctane and cyclohexane, or a petroleum ether, or an ether, e.g., diethyl ether or or tetrahydrofuran. The reaction is advantageously conducted under an inert gas atmosphere, at a temperature of from −70° to +110° C., preferably from −30° to +60° C.

Other methods can also be used for the production of the benzyllithium compounds of Formula III (Y = Li). For example, a benzyl halogenide of Formula XV can be reacted directly with metallic lithium according to methods described in the literature, or, for instance, a Grignard compound of Formula III (Y = MgZ) can be converted into a benzyllithium compound of Formula III (Y = Li) by treatment with lithium.

The substituted pyridines of Formula IV are known or can be prepared in accordance with conventional methods.

The compounds of formula V are obtained from nitro compounds which otherwise correspond to Formula I but $R_7$ is NO$_2$, by reduction and diazotization according to conventional methods described in the literature.

Compounds of Formula VI can be produced, for example, from substituted 5-amino-3-benzylvaleric acids by splitting off H$_2$O. They can also be obtained by Beckmann rearrangement from the substituted 3-benzylcyclopentanone oximes of Formula XVI

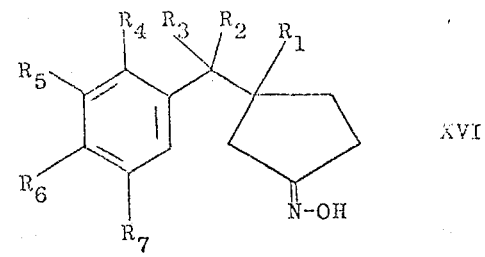

wherein $R_1$ through $R_7$ have the values given above, by treatment with an acidic catalyst, e.g., H$_2$SO$_4$, CF$_3$COOH, BF$_3$ or polyphosphoric acid.

Compounds of Formula VII are obtained, for example, from compounds of Formula IX ($R_9$ = CN) by Michael addition of malonic esters, gentle saponification of the ester groups, acidification and decarboxylation in a conventional manner.

The production of compounds of general Formula I from the compounds of general Formula II is accomplished according to known methods. For example, the dicarboxylic acids of Formula II ($X_1$, $X_2$ = OH) can be converted into their ammonium salts by treatment with ammonia and the ammonium salts can be converted into the imides of formula I by heating, with water and ammonia being split off. Preferably, the reaction is effected without solvent at a temperature of from +150° to +330° C. It is also possible to convert a monoamide of Formula II ($X_1$ = OH; $X_2$ = NH$_2$) into an imide of Formula I by heating. It is also possible to convert a dihalogenide of Formula II ($X_1$, $X_2$ = Cl or Br) directly to an imide of Formula I by reaction with NH$_3$, preferably in a solution, or by first converting the dihalogenide into a diamide of Formula II ($X_1$, $X_2$ = NH$_2$) and then converting the diamides into an imide of Formula I by subsequent heating.

It is particularly advantageous to react an anhydride of Formula II ($X_1+X_2=O$) with ammonia or an ammonia-generating compound, e.g., $(NH_4)_2CO_3$. Preferably, the anhydrides of Formula II are heated with aqueous ammonia solution, the water distilled off and the heating continued until the gas evolution ceases and nothing further distills over. For example, when using $(NH_4)_2CO_3$ as the agent yielding ammonia, mixtures of the anhydride with ammonium carbonate are heated in most cases until the reaction mixture has melted completely and the evolution of $NH_3$ and/or $CO_2$ ceases.

Correspondingly to the glutaric acid anhydrides of Formula II ($X_1+X_2=0$), the mixed anhydrides of Formula II ($X_1, X_2 = OCOR_8$) can likewise be employed to produce the glutarimides of Formula I. Likewise, the esters of Formula II ($X_1, X_2 = OR_8$) can be reacted to the imides of Formula I with ammonia or ammonia-producing compounds.

Likewise, starting compounds of Formula II can also be reacted, according to one of the above-described procedures, to produce imides of Formula I wherein the $X_1$ and $X_2$ are not identical.

The reaction of a compound of general Formula III with a compound of general Formula IV is preferably conducted in an inert organic solvent, especially an ether, e.g., diethyl ether, di-n-butyl ether, tetrahydrofuran or dioxane, or a mixture thereof. Preferably, a solution of a Grignard compound of general Formula III is added to a solution of a pyridine derivative of Formula IV at a temperature of from −70° to +60° C., especially from −10° to +35° C. After termination of the reaction, usually from 15 minutes to 24 hours, the excess organometallic compound is decomposed in a conventional manner, e.g., with an aqueous $NH_4Cl$ solution, and the reaction mixture worked up in accordance with known methods.

Compounds of Formula I can be produced from compounds of Formula V by the conventional method of "concentration by boiling", e.g., by heating an aqueous solution thereof, preferably a sulfuric acid solution, at a temperature, for example, of from 100° to 160° C. Optionally, an inorganic sulfate, e.g., $Na_2SO_4$, is added.

Compounds of Formula VI, when treated with oxidizing agents, likewise yield compounds of Formula I. Preferably, inorganic, aliphatic or aromatic hydroperoxides are utilized for this purpose, e.g., $H_2O_2$ or $RuO_4$; tert. —$C_4H_9OOH$ or cumene or an inorganic or organic peracid, e.g., periodic acid, $CH_3CO_3H$, $CF_3CO_3H$, $C_6H_5CO_3H$ or m—Cl—$C_6H_4CO_3H$. Advantageously, the reaction is carried out in the presence of a transition metal compound, e.g., Co(II) salts, Mn(II) salts or Mn(III) salt, e.g., $Co(NO_3)_2 \cdot 6H_2O$ or Mn(II) acetonylacetonate. Inert organic solvents are employed in this reaction, for example, hydrocarbons, e.g., heptane, benzene, toluene or 1,2,3,4-tetrahydronaphthalene, halogenated hydrocarbons, e.g., $CHCl_3$, $CCl_4$, perchlorobutadiene or chlorobenzene, or an ester, e.g., ethyl acetate. The reaction temperatures range from −35° to +40° C., preferably from −10° to +25° C. The reaction times generally are 1–24 hours.

Another suitable oxidizing agent is atmospheric oxygen, preferably in the presence of transition metal salts, e.g., as $Co(NO_3)_2$. The reaction is preferably conducted in an inert organic solvent, e.g., one of the above-mentioned solvents.

$K_2S_2O_8$ can also be used as the oxidizing agent. In this case, the reaction is advantageously carried out in an aqueous medium with the addition of $K_2HPO_4$ at a temperature of from 50° to 100° C.

A compound of general Formula I is preferably produced from a compound of Formula VII by heating in the dry state, optionally also in an inert organic solvent, to a temperature of from 90° to 210° C., preferably 120°–160° C. Examples of suitable solvents are the hydrocarbons, e.g., toluene, o-, m-, p-xylene, 1- or 2-methylnaphthalene and diphenyl; halogenated hydrocarbons, e.g., as chlorobenzene, o-dichlorobenzene, bromobenzene and hexaclorobutadiene; ethers, e.g., diphenyl ether; and mixtures thereof.

Compounds otherwise corresponding to Formula I which contain, in place of a hydrogen atom, a reducible group and/or a group replaceable by a hydrogen atom, are especially those of Formulae Ig and Ih:

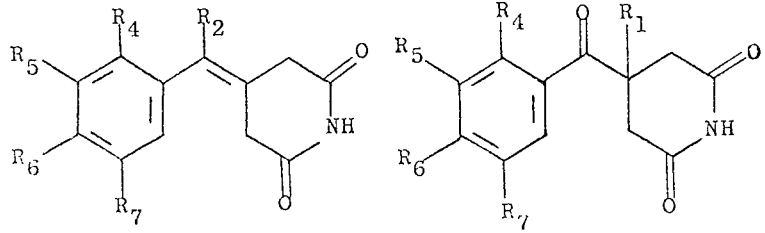

wherein $R_1$, $R_2$ and $R_4$-$R_7$ have the values given above. The hydrogenation of the double bonds of the compounds of Formula Ig is achieved according to the methods described hereinabove. The conversion of the carbonyl group of the compounds of Formula Ih into a methylene group can be effected either directly by exchanging the carbonyl oxygen with hydrogen atoms, or indirectly after conversion of the keto group into a functional derivative. The direct substitution of the carbonyl oxygen for hydrogen is accomplished, for example, by treatment with a chemical reducing agent, e.g., amalgamated zinc/HCl (method according to Clemmensen), or with zinc dust in an acidic or alkaline solution. A Clemmensen reduction is conducted according to the reaction conditions described in the literature, in most cases as a twophase reaction.

In general, the carbonyl compound (Ih) is dissolved in a water immiscible organic solvent, e.g., benzene or toluene, and added to a 20–40 percent aqueous HCl solution containing amalgamated zinc. Since the reaction takes place with good yields only if the compound to be reduced is at least partially soluble in water, minor amounts of a solvent which are soluble in water as well as in the organic phase, can be added as a solubilizer, e.g., ethanol, glacial acetic acid and dioxane. The reaction mixture is then refluxed and, after termination of the reaction, e.g., after 4–24 hours, worked up according to conventional methods.

It is likewise possible to hydrogenate the carbonyl group of Formula Ih catalytically to a methylene group.

Examples of suitable catalysts are copper chromite and the noble metals, the latter also can be in the form of supported catalyst or as an oxide catalyst. The reaction is generally conducted at a temperature of from 30° to 280° C. and under pressures of from one atmosphere to 340 atmospheres.

The most important method for the reduction of the carbonyl group of a compound of Formula Ih via an intermediate product is the procedure according to Wolff-Kishner, optionally with the modification of Huant-Milon. The carbonyl compound is first converted with hydrazine or semicarbazide into the corresponding hydrazone or semicarbazone, and the latter are then converted to the desired methylene compound by heating with a base, preferably an alkali hydroxide or alkali alcoholate, e.g., KOH, NaOH, $KOC_2H_5$ and KO—tert. —$C_4H_9$, preferably with an inert solvent, e.g., ethylene glycol or dior triethylene glycol. It is particularly advantageous to employ anhydrous dimethyl sulfoxide as the solvent and sublimed potassium tert. -butylate. Thus reaction takes place at room temperature in high yields.

In a thus-obtained compound of Formula I, one of the groups $R_1$ through $R_7$ can, if desired, be converted into another $R_1$ through $R_7$, having a different value. Thus, for example, a halogen atom, preferably chlorine or bromine, or a $NO_2$ group, can be introduced into the benzene ring, when at least one of $R_4$ through $R_6$ is H. The introduction of these groups is accomplished according to known methods by electrophilic substitution, especially by halogenation or nitration, preferably in the presence of a Lewis acid as the catalyst, using an inert solvent, e.g., chloroform, carbon tetrachloride, carbon disulfide, or glacial acetic acid at a temperature preferably from 0° C. to the boiling point of the solvent. It is also possible, for example, to convert a thus-introduced nitro group into an amino group by reduction. The amino group, in turn, can be alkyalted, acylated, or converted into a diazonium group according to known methods. The diazonium group can, according to conventional procedures, be converted into an OH group, e.g., by boiling in water to effect concentration, or into a halogen atom (Cl or Br, for example according to the method of Sandmeyer; F in accordance with the Schiemann method by conversion into the diazonium tetrafluoroborate and subsequent dry decomposition of this salt). It is also possible to convert a thus-produced OH group, by treatment with an alkylating or acylating agent according to known methods, into an O-alkyl group or an O-acyl group.

For alkylating reactions, conventional alkylating agents can be employed, e.g., alkyl halogenides, preferably bromides or iodides, alkyl sulfates or alkyl sulfonates, preferably alkyl esters of methane-, ethane-, 2-hydroxethane-, p-toluene-, 1-naphthyl- or 2-naphthylsulfonic acid.

The alkylating agents can be employed in stoichiometric quantitative ratios but it is advantageous to utilize the alkylating agent in excess. The alkylation can be conducted in the presence of a catalyst. If a halogenide or sulfonic acid ester is utilized as the alkylating agent, the addition of a base is recommended, e.g., an alkali, such as sodium or potassium hydroxide, sodium or potassium carbonate, or an amine, e.g., pyridine, collidine or triethylamine, which can also serve as the solvent. Another suitable base is an alkali metal alcoholate, e.g., sodium or potassium methylate, sodium or potassium ethylate, sodium or potassium isopropylate, sodium or potassium tert. -butylate. As the additional solvent in this process, the corresponding alcohol is suitably utilized, e.g., methanol, ethanol, isopropanol or tert.-butanol.

Other solvents inert with respect to the catalyst employed can also be used, e.g., hydrocarbons, including benzene, toluene, or xylene, or, especially when using potassium carbonate, a ketone, e.g., acetone. The reaction temperatures for the etherification are preferably from 0° to the boiling point of the solvent employed, particularly from 20° to 160° C. The reaction times are essentially dependent on the type of etherification agent and on the reaction temperature selected. They range generally from 15 minutes to 48 hours.

The acylations can be effected according to conventional methods described in the literature. Preferably, the abovementioned carboxylic acids or their halogenides or anhydrides are employed or their thiol derivatives or their ketenes. Transacylation methods can also be utilized.

Compounds of Formula I wherein $R_2$ and $R_3$ = H can be converted into compounds otherwise corresponding to Formula I wherein $R_2$ is Br by treatment with N-bromosuccinimide in a inert solvent, e.g., a hydrocarbon such as hexane, cyclohexane or benzene or a halogenated hydrocarbon, e.g., $CHCl_3$, $CCl_4$, $CH_2Cl$—$CH_2Cl$, hexachlorobutadiene, chlorobenzene or bromobenzene, and optionally under simultaneous irradiation with short-wave light. By treatment with Mg in ether, for example, and reaction of the thus-obtained organometallic compound with an aldehyde containing up to 6 carbon atoms, followed by dehydration, and hydrogenation, compounds of Formula I can be produced wherein $R_2$ is alkyl of up to 6 carbon atoms.

Substituted glutarimides of Formula I produced, for example, according to one of the above-described processes, can then be utilized employing conventional reactions as intermediates for the synthesis of tetracyclines, wherein preferably first the aldehydes of Formula VIII (T = CHO) are employed as intermediates. As is known, tetracyclines are useful per se or as intermediates in the production of antibiotics, which are useful against both gram positive and gram negative bacteria, e.g. *Pasteurella cuniculicida, Escherichia coli, Proteus vulgaris, Shigella crusei, Salmonella newport, Staphylococcus aureus* "Gray," *Streptococcus pyogenes,* and *Klebsiella friedl.*

EXAMPLE A

The tetracycline of formula XVII ($R_{12}$ = OH; $R_{13}$ = $R_{14}$ = $CH_3$; $R_{15}$ = $R_{16}$ = H; = minocyclin)

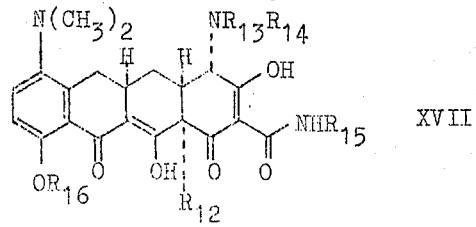

can be prepared e.g. by the following reaction sequence: 160 g of 3-(2-dimethylamino-5-methoxybenzyl)-glutarimide are dissolved in 2 l of liquid hydrogen fluoride, set aside for 72 hours, the hydrogen fluoride is distilled off, the residue stirred with ice water, extracted with chloroform, the extract washed with aqueous sodium carbonate solution and water, dried over $NaSO_4$ and evaporated.

The resulting 5-dimethylamino-8-methoxy-1-oxo-1,2,3,4-tetrahydro-3-naphthylacetamide is boiled for 6 hours in 2.5 l pyridine with 200 g of p-toluenesulfonic acid chloride, stirred in addition for 12 hours, the solvent is distilled off, the residue stirred with 1 l ice water, 500 ml of 10 % NaOH solution are added and the mixture is extracted with chloroform, the extract dried over $Na_2SO_4$ and evaporated.

The resulting 5-dimethylamino-8-methoxy-1-oxo-1,2,3,4-tetrahydro-3-naphthylacetonitrile is dissolved in 1 l of pyridine, buffered with 400 g $Na_3PO_4$ in 800 ml of $H_2O$, after the addition of 2 l glacial acetic acid heated with 40 g of Raney nickle under nitrogen for 4 hours to 55°, the mixture is filtered after cooling, extracted with chloroform, the extract dried over $Na_2SO_4$ and evaporated.

The resulting 5-dimethylamino-8-methoxy-1-oxo-1,2,3,4-tetrahydro-3-naphthyl-acetaldehyde was dissolved in dry tetrahydrofurane, and treated with hippuric acid and acetic anhydride, using dry lead acetate as a catalyst. The mixture was refluxed for 3 hours, cooled, diluted with $H_2O$ and extracted with chloroform, the extract was evaporated after drying over $Na_2SO_4$.

10 g of the resulting azlactone was dissolved in a mixture of 150 ml of dry tetrahydrofurane with 50 ml of dry ether, 5.5 g of methyl-N-tert.-butyl-3-oxo-glutaramate and 2.2 g sodium hydride in mineral oil suspension were added, the mixture was stirred for one hour, refluxed for 30 hours, cooled, diluted with 0.5 l $H_2O$, extracted with chloroform, the extract was washed with $H_2O$, dried over $Na_2SO_4$ and evaporated.

Separation of stereoisomers was achieved by chromatography on a silica gel colunn, yielding compound XVII ($R_{12} = R_{13} = H$, $R_{14} = COC_6H_5$, $R_{15} = C(CH_3)_3$, $R_{16} = CH_3$).

2 g of compound XVII ($R_{12} = R_{13} = H$, $R_{14} = COC_6H_5$, $R_{15} = C(CH_3)_3$, $R_{16} = CH_3$) were dissolved in a mixture of 80 ml dimethylformamide, and 200 ml tetrahydrofurane, 560 mg of triethylphosphite and 400 mg of sodium hydride in mineral oil were added, oxygen was bubbled through the solution for 15 minutes, the solution was diluted with 400 ml $H_2O$, extracted with chloroform, which was dried over $Na_2SO_4$ and evaporated.

The resulting compound XVII ($R_{12}$ = OH, $R_{13}$ = H, $R_{14} = COC_6H_5$, $R_{15} = C(CH_3)_3$, $R_{16} = CH_3$) was treated with excess of triethyloxonium tetrafluoroborate in $CH_2Cl_2$ at room temperature. After 48 hours excess 5 % aqueous $K_2CO_3$ was added, the organic layer separated, dried and evaporated, the residue was dissolved in 25 ml of tetrahydrofurane, 15 ml of 0.1 N HCl were added, the mixture was extracted with chloroform after 1 hour, the extract dried over $Na_2SO_4$ and evaporated.

100 mg of the resulting compound XVII ($R_{12}$ = OH, $R_{13} = R_{14}$ = H, $R_{15} = C(CH_3)_3$, $R_{16} = CH_3$) were dissolved in 10 ml chloroform containing 0.04 ml diisopropyl ethylamine, 17 ml dimethyl sulfate were added, the mixture stirred for 12 hours, washed with water, dried over $Na_2SO_4$ and evaporated.

The resulting compound XVII ($R_{12}$ = OH, $R_{13} = R_{14} = R_{16} = CH_3$, $R_{15} = C)CH_3)_3$) was heated under nitrogen with 10 ml of 48 % HBr to 100° for 0.5 hours. After cooling and neutralization with 20 % aqueous NaOH the mixture was extracted with n-butanol, the extract was washed with $H_2O$, dried over $Na_2SO_4$ and evaporated. Compound XVII ($R_{12}$ = OH, $R_{13} = R_{14} = CH_3$, $R_{15} = R_{16} = H$) was obtained after chromatographic purification of the residue (polyamide/ethanol).

The other compounds of formula I and their salts and/or quaternary ammonium compounds can be utilized in an analogous manner for producing tetracyclines, their salts and/or quaternary ammonium derivatives of tetracyclines.

Without further elaboration, it is believed that one skilled in the art can, using the preceding description, utilize the present invention to its fullest extent. The following preferred specific embodiments are, therefore, to be construed as merely illustrative, and not limitative of the remainder of the disclosure in any way whatsoever.

In the following examples, the temperatures are set forth in degrees Celsius.

EXAMPLE 1

Under cooling, 28.2 g. of 3-(2,5-dimethoxybenzyl)-glutaric acid (m.p. 102°–103°; obtainable, for example, from hydroquinone dimethyl ether by reaction with succinic anhydride in the presence of $AlCl_3$, condensation of the thus-produced 4-(2,5-dimethoxyphenyl)-4-oxobutyric acid [m.p. 103°–105°] with glyoxylic acid and reduction of the thus-obtained 3-(2,5-dimethylbenzoyl)-glutaconic acid [m.p. 163°–166°]) is dissolved in 60 ml. of concentrated aqueous $NH_3$ solution; the solution of the intermediarily formed diammonium salt is heated, and all volatile components of the reaction mixture are distilled off. After 60 minutes, the temperature has risen to 160°; the reaction mixture is maintained at between 160° and 170° for another 30 minutes, comminuted after cooling, washed several times with $H_2O$, and dried, thus obtaining 3-(2,5-dimethoxybenzyl)-glutarimide, m.p. 111°–113° (from methanol).

EXAMPLE 2

Under an atmosphere of $NH_3$, 56.4 g. of 3-(2,5-dimethoxybenzyl)-glutaric acid monamide (m.p. 118°–119°; obtainable from 3-(2,5-dimethoxybenzyl)-glutaric acid by reaction with the stoichiometric quantity of $SOCl_2$, reaction of the acid monochloride with an aqueous $NH_3$ solution, and liberation of the starting product from the thus-produced ammonium salt) is heated to 150°–160° for 90 minutes. After cooling, the reaction product is comminuted, washed with water, dried, and 3-(2,5-dimethoxybenzyl)-glutarimide is produced in this manner, m.p. 111°–113° (from methanol).

EXAMPLE 3

A solution of 2,5-dimethoxybenzylmagnesium chloride (produced from 187 g. of 2,5-dimethoxybenzyl chloride and 24.3 g. of magnesium filings) in 1000 ml. of anhydrous tetrahydrofuran is added, at 25°–30°, to a solution of 133 g. of 2,6-dichloropyridine in 1000 ml. of anhydrous tetrahydrofuran; the reaction mixture is agitated for 1 hour, poured into an ice-cold solution of 200 g. of $NH_4Cl$ in 10 l. of water, extracted with chloroform, and the solvent distilled off. The residue is dissolved in 1000 ml. of ether, cooled with ice water, the crystals are vacuum-filtered and dried, thus obtaining 3-(2,5-dimethoxybenzyl)-glutarimide, m.p. 111°–113° (from methanol).

Analogously, from the following starting compounds:

3-methoxybenzylmagnesium chloride
3,5-dimethoxybenzylmagnesium chloride
2-fluoro-5-methoxybenzylmagnesium chloride
2-chloro-5-methoxybenzylmagnesium chloride
2-bromo-5-methoxybenzylmagnesium chloride
5-methoxy-2-methylbenzylmagnesium chloride
3-methoxy-4-methylbenzylmagnesium chloride 4-bromo-2,5-dimethoxybenzylmagnesium chloride
2-chloro-5-methoxy-4-methylbenzylmagnesium chloride
α-naphthylmethylmagnesium chloride
3,4,5-trimethoxybenzylmagnesium chloride
2,3,5-trimethoxybenzylmagnesium chloride
3,5-diethoxybenzylmagnesium chloride
3,5-di-n-propoxybenzylmagnesium chloride
3,5-di-n-butoxybenzylmagnesium chloride
3,5-di-n-pentoxybenzylmagnesium chloride
3,5-di-n-hexoxybenzylmagnesium chloride
3,5-di—benzyloxybenzylmagnesium chloride
3-benzyloxy-5-methoxybenzylmagnesium chloride
2-fluoro-5-ethoxybenzylmagnesium chloride
2-fluoro-5-n-hexoxybenzylmagnesium chloride
2-fluoro-5-benzyloxybenzylmagnesium chloride
2-chloro-5-ethoxybenzylmagnesium chloride
2-chloro-5-n-hexoxybenzylmagnesium chloride
2-chloro-5-benzyloxybenzylmagnesium chloride
2-bromo-5-ethoxybenylmagnesium chloride
2-bromo-5-hexoxybenzylmagnesium chloride
2-bromo-5-benzyloxybenzylmagnesium chloride
5-methoxy-2-ethylbenzylmagnesium chloride
5-methoxy-2-n-propylbenzylmagnesium chloride
5-methoxy-2-isopropylbenzylmagnesium chloride
5-methoxy-2-n-butylbenzylmagnesium chloride
5-methoxy-2-isobutylbenzylmagnesium chloride
5-methoxy-2-sec.-butylbenzylmagnesium chloride
5-methoxy-2-tert.-butylbenzylmagnesium chloride
5-methoxy-2-vinylbenzylmagnesium chloride
5-methoxy-2-ethinylbenzylmagnesium chloride
5-methoxy-2-allylbenzylmagnesium chloride
5-methoxy-2-trifluoromethylbenzylmagnesium chloride
5-methoxy-2-dimethylaminobenzylmagnesium chloride
5-methoxy-2-diethylaminobenzylmagnesium chloride
3-fluoro-2,5-dimethoxybenzylmagnesium chloride
3-chloro-2,5-dimethoxybenzylmagnesium chloride
3-bromo-2,5-dimethoxybenzylmagnesium chloride
3-methyl-2,5-dimethoxybenzylmagnesium chloride
3-ethyl-2,5-dimethoxybenzylmagnesium chloride
3-n-propyl-2,5-dimethoxybenzylmagnesium chloride
3-n-hexyl-2,5-dimethoxybenzylmagnesium chloride
3-vinyl-2,5-dimethoxybenzylmagnesium chloride
3-ethinyl-2,5-dimethoxybenzylmagnesium chloride
3-allyl-2,5-dimethoxybenzylmagnesium chloride
3-trifluoromethyl-2,5-dimethoxybenzylmagnesium chloride
3-dimethylamino-2,5-dimethoxybenzylmagnesium chloride
3-diethylamino-2,5-dimethoxybenzylmagnesium chloride
4-fluoro-2,5-dimethoxybenzylmagnesium chloride
4-chloro-2,5-dimethoxybenzylmagnesium chloride
4-methyl-2,5-dimethoxybenzylmagnesium chloride
4-ethyl-2,5-dimethoxybenzylmagnesium chloride
4-n-propyl-2,5-dimethoxybenzylmagnesium chloride
4-n-hexyl-2,5-dimethoxybenzylmagnesium chloride
4-vinyl-2,5-dimethoxybenzylmagnesium chloride
4-ethinyl-2,5-dimethoxybenzylmagnesium chloride
4-allyl-2,5-dimethoxybenzylmagnesium chloride
4-dimethylamino-2,5-dimethoxybenzylmagnesium chloride
4-diethylamino-2,5-dimethoxybenzylmagnesium chloride
2-fluoro-3,5-dimethoxybenzylmagnesium chloride
2-chloro-3,5-dimethoxybenzylmagnesium chloride
2-bromo-3,5-dimethoxybenzylmagnesium chloride
2-methyl-3,5-dimethoxybenzylmagnesium chloride
2-ethyl-3,5-dimethoxybenzylmagnesium chloride
2-n-propyl-3,5-dimethoxybenzylmagnesium chloride
2-n-hexyl-3,5-dimethoxybenzylmagnesium chloride
2-vinyl-3,5-dimethoxybenzylmagnesium chloride
2-ethinyl-3,5-dimethoxybenzylmagnesium chloride
2-trifluoromethyl-3,5-dimethoxybenzylmagnesium chloride
2-dimethylamino-3,5-dimethoxybenzylmagnesium chloride
2-diethylamino-3,5-dimethoxybenzylmagnesium chloride, the following products are obtained be reaction with 2,6-dichloropyridine:

3-(3-methoxybenzyl)-glutarimide, m.p. 144°–146°
3-(3,5-dimethoxybenzyl)-glutarimide, m.p. 130°–131°
3-(2-fluoro-5-methoxybenzyl)-glutarimide
3-(2-chloro-5-methoxybenzyl)-glutarimide, m.p. 140°–142°
3-(2-bromo-5-methoxoybenzyl)-glutarimide, m.p. 129°–131°
3-(5-methoxy-2-methylbenzyl)-glutarimide, m.p. 126°–128°
3-(3-methoxy-4-methylbenzyl)-glutarimide, m.p. 170°–171°
3-(4-bromo-2,5-dimethoxybenzyl)-glutarimide, m.p. 163°–164°
3-(2-chloro-5-methoxy-4-methylbenzyl)-glutarimide, m.p. 137°–139°
3-(α-naphthylmethyl)-glutarimide, m.p. 207°–208°
3-(3,4,5-trimethoxybenzyl)-glutarimide
3-(2,3,5-trimethoxybenzyl)-glutarimide
3-(3,5-diethoxybenzyl)-glutarimide
3-(3,5-di-n-propoxybenzyl)-glutarimide
3-(3,5-di-n-butoxybenzyl)-glutarimide
3-(3,5-di-n-pentoxybenzyl)-glutarimide
3-(3,5-di-n-hexoxybenzyl)-glutarimide
3-(3,5-di-benzyloxybenzyl)-glutarimide
3-(3-benzyloxy-5-methoxybenzyl)-glutarimide
3-(2-fluoro-5-ethoxybenzyl)-glutarimide
3-(2-fluoro-5-n-hexoxybenzyl)-glutarimide
3-(2-fluoro-5-benzyloxybenzyl)-glutarimide
3-(2-chloro-5-ethoxybenzyl)-glutarimide
3-(2-chloro-5-n-hexoxybenzyl)-glutarimide
3-(2-chloro-5-benzyloxybenzyl)-glutarimide
3-(2-bromo-5-ethoxybenzyl)-glutarimide
3-(2-bromo-5-hexoxybenzyl)-glutarimide
3-(2-bromo-5-benzyloxybenzyl)-glutarimide
3-(5-methoxy-2-ethylbenzyl)-glutarimide
3-(5-methoxy-2-n-propylbenzyl)-glutarimide
3-(5-methoxy-2-isopropylbenzyl)-glutarimide
3-(5-methoxy-2-n-butylbenzyl)-glutarimide
3-(5-methoxy-2-isobutylbenzyl)-glutarimide
3-(5-methoxy-2-sec.-butylbenzyl)-glutarimide
3-(5-methoxy-2-tert.-butylbenzyl)-glutarimide
3-(5-methoxy-2-vinylbenzyl)-glutarimide
3-(5-methoxy-2-ethinylbenzyl)-glutarimide
3-(5-methoxy-2-allylbenzyl)-glutarimide
3-(5-methoxy-2-trifluoromethylbenzyl)-glutarimide
3-(5-methoxy-2-dimethylaminobenzyl)-glutarimide
3-(5-methoxy-2-diethylaminobenzyl)-glutarimide
3-(3-fluoro-2,5-dimethoxybenzyl)-glutarimide
3-(3-chloro-2,5-dimethoxybenzyl)-glutarimide
3-(3-bromo-2,5-dimethoxybenzyl)-glutarimide
3-(3-methyl-2,5-dimethoxybenzyl)-glutarimide
3-(3-ethyl-2,5-dimethoxybenzyl)-glutarimide 3-(3-n-propyl-2,5-dimethoxybenzyl)-glutarimide
3-(3-n-hexyl-2,5-dimethoxybenzyl)-glutarimide
3-(3-vinyl-2,5-dimethoxybenzyl)-glutarimide
3-(3-ethinyl-2,5-dimethoxybenzyl)-glutarimide
3-(3-allyl-2,5-dimethoxybenzyl)-glutarimide
3-(3-trifluoromethyl-2,5-dimethoxybenzyl)-glutarimide
3-(3-dimethylamino-2,5-dimethoxybenzyl)-glutarimide
3-(3-diethylamino-2,5-dimethoxybenzyl)-glutarimide
3-(4-fluoro-2,5-dimethoxybenzyl)-glutarimide
3-(4-chloro-2,5-dimethoxybenzyl)-glutarimide
3-(4-methyl-2,5-dimethoxybenzyl)-glutarimide
3-(4-ethyl-2,5-dimethoxybenzyl)-glutarimide
3-(4-n-propyl-2,5-dimethoxybenzyl)-glutarimide
3-(4-n-hexyl-2,5-dimethoxybenzyl)-glutarimide
3-(4-vinyl-2,5-dimethoxybenzyl)-glutarimide
3-(4-ethinyl-2,5-dimethoxybenzyl)-glutarimide
3-(4-allyl-2,5-dimethoxybenzyl)-glutarimide
3-(4-dimethylamino-2,5-dimethoxybenzyl)-glutarimide
3-(4-diethylamino-2,5-dimethoxybenzyl)-glutarimide
3-(2-fluoro-3,5-dimethoxybenzyl)-glutarimide
3-(2-chloro-3,5-dimethoxybenzyl)-glutarimide
3-(2-bromo-3,5-dimethoxybenzyl)-glutarimide
3-(2-methyl-3,5-dimethoxybenzyl)-glutarimide
3-(2-ethyl-3,5-dimethoxybenxyl)-glutarimide
3-(2-n-propyl-3,5-dimethoxybenzyl)-glutarimide
3-(2-n-hexyl-3,5-dimethoxybenzyl)-glutarimide
3-(2-vinyl-3,5-dimethoxybenzyl)-glutarimide
3-(2-ethinyl-3,5-dimethoxybenzyl)-glutarimide
3-(2-trifluoromethyl-3,5-dimethyoxybenzyl)-glutarimide
3-(2-dimethylamino-3,5-dimethoxybenzyl)-glutarimide
3(2-diethylamino-3,5-dimethoxybenzyl)-glutarimide;

and by reaction with 2,6-dichloro-4-methylpyridine, the following final products are produced:

3-(3-methoxybenzyl)-3-methylglutarimide, m.p. 110°
3-(3,5dimethoxybenzyl)-3-methylglutarimide, m.p. 124°
3-(2-fluoro-5-methoxybenzyl)-3-methylglutarimide
3-(2-chloro-5-methoxybenzyl)-3-methylglutarimide, m.p. 126°–127°
3-(2-bromo-5-methoxybenzyl)-3-methylglutarimide, m.p. 137°–138°
3-(5-methoxy-2-methylbenzyl)-3-methylglutarimide, m.p. 126°–127°
3-(3-methoxy-4-methylbenzyl)-3-methylglutarimide, m.p. 142°–143°
3-(4-bromo-2,5-dimethoxybenzyl)-3-methylglutarimide
3-(2-chloro-5-methylbenzyl)-3-methylglutarimide
3-(α-naphthylmethylbenzyl)-3-methylglutarimide
3-(3,4,5-trimethoxybenzyl)-3-methylglutarimide
3-(2,3,5-trimethoxybenzyl)-3-methylglutarimide
3-(3,5-diethoxybenzyl)-3-methylglutarimide
3-(3,5-di-n-propoxybenzyl)-3-methylglutarimide
3-(3,5-di-n-butoxybenzyl)-3-methylglutarimide
3-(3,5-di-n-pentoxybenzyl)-3-methylglutarimide
3-(3,5-di-n-hexoxybenzyl)-3-methylglutarimide
3-(3,5-di-benzyloxybenzyl)-3-methylglutarimide
3-(3-benzyloxy-5-methoxybenzyl)-3-methylglutarimide
3-(2-fluoro-5-ethoxybenzyl)-3-methylglutarimide
3-(2-fluoro-5-n-hexoxybenzyl)-3-methylglutarimide
3-(2-fluoro-5-benzyloxybenzyl)-3-methylglutarimide
3-(2-chloro-5-ethoxybenzyl)-3-methylglutarimide
3-(2-chloro-5-n-hexoxybenzyl)-3-methylglutarimide
3-(2-chloro-5-benzyloxybenzyl)-3-methylglutarimide
3-(2-bromo-5-ethoxybenzyl)-3-methylglutarimide
3-(2-bromo-5-hexoxybenzyl)-3-methylglutarimide
3-(2-bromo-5-benzyloxybenzyl)-3-methylglutarimide
3-(5-methoxy-2-ethylbenzyl)-3-methylglutarimide
3-(5-methoxy-2-n-propylbenzyl)-3-methylglutarimide
3-(5-methoxy-2-isopropylbenzyl)-3-methylglutarimide
3-(5-methoxy-2-n-butylbenzyl)-3-methylglutarimide
3-(5-methoxy-2-isobutylbenzyl)-3-methylglutarimide
3-(5-methoxy-2-sec.-butylbenzyl)-3-methylglutarimide
3-(5-methoxy-2-tert.-butylbenzyl)-3-methylglutarimide
3-(5-methoxy-2-vinylbenzyl)-3-methylglutarimide
3-(5-methoxy-2-ethinylbenzyl)-3-methylglutarimide
3-(5-methoxy-2-allylbenzyl)-3-methylglutarimide
3-(5-methoxy-2-trifluoromethylbenzyl)-3-methylglutarimide
3-(5-methoxy-2-dimethylaminobenzyl)-3-methylglutarimide
3-(5-methoxy-2-diethylaminobenzyl)-3-methylglutarimide
3-(3-fluoro-2,5-dimethoxybenzyl)-3-methylglutarimide
3-(3-chloro-2,5-dimethoxybenzyl)-3-methylglutarimide
3-(3-bromo-2,5-dimethoxybenzyl)-3-methylglutarimide
3-(3-methyl-2,5-dimethoxybenzyl)-3-methylglutarimide
3-(3-ethyl-2,5-dimethoxybenzyl)-3-methylglutarimide
3-(3-n-propyl-2,5-dimethoxybenzyl)-3-methylglutarimide
3-(3-n-hexyl-2,5-dimethoxybenzyl)-3-methylglutarimide
3-(3-vinyl-2,5-dimethoxybenzyl)-3-methylglutarimide
3-(3-ethinyl-2,5-dimethoxybenzyl)-3-methylglutarimide
3-(3-allyl-2,5-dimethoxybenzyl)-3-methylglutarimide
3-(3-trifluoromethyl-2,5-dimethoxybenzyl)-3-methylglutarimide
3-(3-dimethylamino-2,5-dimethoxybenzyl)-3-methylglutarimide
3-(3-diethylamino-2,5-dimethoxybenzyl)-3-methylglutarimide
3-(4-fluoro-2,5-dimethoxybenzyl)-3-methylglutarimide
3-(4-chloro-2,5-dimethoxybenzyl)-3-methylglutarimide
3-(4-methyl-2,5-dimethoxybenzyl)-3-methylglutarimide
3-(4-ethyl-2,5-dimethoxybenzyl)-3-methylglutarimide
3-(4-n-propyl-2,5-dimethoxybenzyl)-3-methylglutarimide
3-(4-n-hexyl-2,5-dimethoxybenzyl)-3-methylglutarimide
3-(4-vinyl-2,5-dimethoxybenzyl)-3-methylglutarimide
3-(4-ethinyl-2,5-dimethoxybenzyl)-3-methylglutarimide
3-(4-allyl-2,5-dimethoxybenzyl)-3-methylglutarimide
3-(4-dimethylamino-2,5-dimethoxybenzyl)-3-methylglutarimide
3-(4-diethylamino-2,5-dimethoxybenzyl)-3-methylglutarimide
3-(2-fluoro-3,5-dimethoxybenzyl)-3-methylglutarimide
3-(2-chloro-3,5-dimethoxybenzyl)-3-methylglutarimide 3-(2-bromo-3,5-dimethoxybenzyl)-3-methylglutarimide
3-(2-methyl-3,5-dimethoxybenzyl)-3-methylglutarimide
3-(2-ethyl-3,5-dimethoxybenzyl)-3-methylglutarimide
3-(2-n-propyl-3,5-dimethoxybenzyl)-3-methylglutarimide
3-(2-n-hexyl-3,5-dimethoxybenzyl)-3-methylglutarimide
3-(2-vinyl-3,5-dimetoxybenzyl)-3-methylglutarimide
3-(2-ethinyl-3,5-dimethoxybenzyl)-3-methylglutarimide
3-(2-trifluoromethyl-3,5-dimethoxybenzyl)-3-methylglutarimide
3-(2-dimethylamino-3,5-dimethoxybenzyl)-3-methylglutarimide
3-(2-diethylamino-3,5-dimethoxybenzyl)-3-methylglutarimide In place of tetrahydrofuran, it is also possible to use diethyl ether, di-n-butyl ether, or dioxane as the solvent.

EXAMPLE 4 a. Under a nitrogen atmosphere, a solution of 3-methoxybenzylmagnesium chloride, produced from 15.7 g. of 3-methoxybenzyl chloride and 2.4 g. of magnesium, in 100 ml. of dry diethyl ether, is added at 0° to 14.1 g. of 2-ethoxy-6-chloropyridine, dissolved in 100 ml. of dry tetrahydrofuran; the reaction mixture is stirred for 30 minutes, 100 ml. of a saturated aqueous $NH_4Cl$ solution is added thereto, the crystals are filtered, washed with ether and $H_2O$, and dried under vacuum, thus obtaining 3-(3-methoxybenzyl)-glutarimide, m.p. 144°–146°.

b. At 30°, 2.3g. of 3-(3-methoxybenzyl)-glutarimide, dissolved in 100 ml. of glacial acetic acid, is agitated for 45 minutes with 10 ml. of concentrated $HNO_3$, the mixture poured into water, the precipitate is filtered, washed with water and ether, dried, and 3-(5-methoxy-2-nitrobenzyl)-glutarimide is thus obtained, m.p. 190°–192°.

c. 1.3 g. of 3-(5-methoxy-2-nitrobenzyl)-glutarimide is dissolved in 100 ml. of methanol; after the addition of 0.4 g. of a Pd-C catalyst (5% strength), the solution is hydrogenated at 1.4 atmospheres until 3 mols of $H_2$ have been absorbed, then filtered, the methanol distilled off, the residue purified by chromatography (silica gel/$CHCl_3$), and 3-(2-amino-5-methoxybenzyl)-glutarimide is thus obtained.

d. At 0°, 0.62 g. of 3-(2-amino-5-methoxybenzyl)-glutarimide is dissolved in 10 ml. of concentrated aqueous HBr, mixed with 0.17 g. of $NaNO_2$ in 5 ml. of $H_2O$, and the solution of the diazonium salt is poured into a boiling solution of 0.14 g. of $Cu_2Br_2$ in 30 ml. of concentrated HBr. The reaction mixture is refluxed for another 30 minutes, poured into 500 ml. of ice water, extracted with $CHCl_3$, dried, the solvent distilled off, and 3-(2-bromo-5-methoxybenzyl)-glutarimide is produced in this manner, m.p. 129°–131° (from methanol).

e. 0.62 g. of 3-(2-amino-5-methoxybenzyl)-glutarimide is added to a boiling mixture of 5 ml. of 98% HCOOH and 0.6 g. of paraformaldehyde; after cooling, the reaction mixture is poured into 100 ml. of ice water, made alkaline with concentrated aqueous $Na_2CO_3$ solution, extracted with chloroform, the solvent distilled off, and, after purification by chromatography (silica gel/$CHCl_3$), one obtains 3-(2-dimethylamino-5-methoxybenzyl)-glutarimide.

f. At room temperature, 3.2 g. of $Br_2$, dissolved in 20 ml. of $CCl_4$, is gradually added to 4.7g. of 3-(3-methoxybenzyl)-glutarimide, dissolved in 50 ml. of $CCl_4$; the mixture is agitated for 1 hour, the solvent is distilled off, and 3-(2-bromo-5-methoxybenzyl)-glutarimide is obtained, m.p. 129°–131°.

g. At 0°, 0.34 g. of $NaNO_2$, dissolved in 10 ml. of $H_2O$, is added to 1.2 g. of 3-(2-amino-5-methoxybenzyl)-glutarimide, dissolved in 20 ml. of concentrated aqueous HCl; to the solution of the diazonium salt, 5 g. of an ice-cooled 40% aqueous $HBF_4$ solution is quickly added, the mixture stirred for 30 minutes, filtered, washed with $H_2O$, methanol, and ether, dried in air overnight, and the diazonium tetrafluoroborate is heated in a dry flask until it has been completely decomposed. The residue is washed with water and dried, thus obtaining 3-(2-fluoro-5-methoxybenzyl)-glutarimide.

h. At 0°, 0.17 g. of $NaNO_2$, dissolved in 5 ml. of $H_2O$, is added to 0.62 g. of 3-(2-amino-5-methoxybenzyl)-glutarimide, dissolved in 20 ml. of concentrated aqueous HCl; the diazonium salt solution is mixed with 0.68 g. of $HgCl_2$, dissolved in 20 ml. of $H_2O$. The precipitate is filtered, dried in air, and thermally decomposed in a round flask. The reaction mixture is extracted with $CHCl_3$, dried over $MgSO_4$, the solvent distilled off, and 3-(2-chloro-5-methoxybenzyl)-glutarimide is thus produced, m.p. 140°–142°.

EXAMPLE 5

Analogously to Example 3, 2,5-dimethoxybenzylmagnesium chloride and 2,6-dichloro-4-methylpyridine yield
3-(2,5-dimethoxybenzyl)-3-methylglutarimide, m.p. 117°;
benzylmagnesium chloride and 2,6-dichloro-4-methylpyridine yield 3-benzyl-3-methylglutarimide, m.p. 119°;
2-bromo-5-methoxy-4-methylbenzylmagnesium chloride and 2,6-dichloro-4-methylpyridine yield
3-(2-bromo-5-methoxy-4-methylbenzyl)-3-methylglutarimide, m.p. 136°–137°;

furthermore, from 2,5-dimethoxybenzylmagnesium chloride,
3,5-dimethoxybenzylmagnesium chloride,
2-chloro-5-methoxybenzylmagnesium chloride,
the following products are obtained:

by reaction with 2,6-dichloro-4-ethylpyridine
   3-(2,5-dimethoxybenzyl)-3-ethylglutarimide,
   3-(3,5-dimethoxybenzyl)-3-ethylglutarimide,
   3-(2-chloro-5-methoxybenzyl)-3-ethylglutarimide;
by reaction with 2,6-dichloro-4-n-propylpyridine
   3-(2,5-dimethoxybenzyl)-3-n-propylglutarimide,
   3-(3,5-dimethoxybenzyl)-3-n-propylglutarimide,
   3-(2-chloro-5-methoxybenzyl)-3-n-propylglutarimide, m.p. 148°–149°;
by reaction with 2,6-dichloro-4-n-butylpyridine
   3-(2,5-dimethoxybenzyl)-3-n-butylglutarimide,
   3-(3,5-dimethoxybenzyl)-3-n-butylglutarimide,
   3-(2-chloro-5-methoxybenzyl)-3-n-butylglutarimide;
by reaction with 2,6-dichloro-4-n-pentylpyridine
   3-(2,5-dimethoxybenzyl)-3-n-pentylglutarimide,
   3-(3,5-dimethoxybenzyl)-3-n-pentylglutarimide, 3-(2-chloro-5-methoxybenzyl)-3-n-pentylglutarimide;

by reaction with 2,6-dichloro-4-n-hexylpyridine
3-(2,5-dimethoxybenzyl)-3-n-hexylglutarimide,
3-(3,5-dimethoxybenzyl)-3-n-hexylglutarimide,
3-(2-chloro-5-methoxybenzyl)-3-n-hexylglutarimide.

EXAMPLE 6

Analogously to Example 3, using the following starting compounds:

1-(3-methoxyphenyl)-ethyl-(1)-magnesium chloride
1-(2-chloro-5-methoxyphenyl)-ethyl-(1)-magnesium chloride
1-(2-bromo-5-methoxyphenyl)-ethyl-(1)-magnesium chloride
1-(2,5-dimethoxyphenyl)-ethyl-(1)-magnesium chloride
1-(3-methoxyphenyl)-propyl-(1)-magnesium chloride
1(2-chloro-5-methoxyphenyl)-propyl-(1)-magnesium chloride
1-(2-bromo-5-methoxyphenyl)-propyl-(1)-magnesium chloride
1-(2,5-dimethoxyphenyl)-propyl-(1)-magnesium chloride
1-(3-methoxyphenyl)-butyl-(1)-magnesium chloride
1-(2-chloro-5-methoxyphenyl)-butyl-(1)-magnesium chloride
1-(2-bromo-5-methoxyphenyl)-butyl-(1)-magnesium chloride
1-(2,5-dimethoxyphenyl)-butyl-(1)-magnesium chloride
1-(3-methoxyphenyl)-pentyl-(1)-magnesium chloride
1-(2-chloro-5-methoxyphenyl)-pentyl-(1)-magnesium chloride
1-(2-bromo-5-methoxyphenyl)-pentyl-(1)-magnesium chloride
1-(2,5-dimethoxyphenyl)-pentyl-(1)-magnesium chloride
1-(3-methoxyphenyl)-hexyl-(1)-magnesium chloride
1-(2-chloro-5-methoxyphenyl)-hexyl-(1)-magnesium chloride
1-(2-bromo-5-methoxyphenyl)-hexyl-(1)-magnesium chloride
1-(2,5-dimethoxyphenyl)-hexyl-(1)-magnesium chloride, the following final products are obtained by reaction with 2,6-dichloropyridine:

3-[1-(3-methoxyphenyl)-ethyl-(1)]-glutarimide, m.p. 139-140°
3-[1-(2-chloro-5-methoxyphenyl)-ethyl-(1)]-glutarimide, m.p. 140-142°
3-[1-(2-bromo-5-methoxyphenyl)-ethyl-(1)]-glutarimide, m.p. 123-125°
3-[1-(2,5-dimethoxyphenyl)-ethyl-(1)]-glutarimide
3-[1-(3-methoxyphenyl)-propyl-(1)]-glutarimide
3-[1-(2-chloro-5-methoxyphenyl)-propyl-(1)]-glutarimide
3-[1-(2-bromo-5-methoxyphenyl)-propyl-(1)]-glutarimide
3-[1-(2,5-dimethoxyphenyl)-propyl-(1)]-glutarimide
3-[1-(3-methoxyphenyl)-butyl-(1)]-glutarimide
3-[1-(2-chloro-5-methoxyphenyl)-butyl-(1)]-glutarimide
3-[1-(2-bromo-5-methoxyphenyl)-butyl-(1)]-glutarimide
3-[1-(2,5-dimethoxyphenyl)-butyl-(1)]-glutarimide
3-[1-(3-methoxyphenyl)-pentyl-(1)]-glutarimide
3-[1-(2-chloro-5-methoxyphenyl)-pentyl-(1)]-glutarimide
3-[1-(2-bromo-5-methoxyphenyl)-pentyl-(1)]-glutarimide
3-[1-(2,5-dimethoxyphenyl)-pentyl-(1)]-glutarimide
3-[1-(3-methoxyphenyl)-hexyl-(1)]-glutarimide
3-[1-(2-chloro-5-methoxyphenyl)-hexyl-(1)]-glutarimide
3-[1-(2-bromo-5-methoxyphenyl)-hexyl-(1)]-glutarimide
3-[1-(2,5-dimethoxyphenyl)-hexyl-(1)]-glutarimide.

EXAMPLE 7 a. In analogy to Example 4(b), the following products are obtained by nitration of 3-(3-methoxybenzyl)-3-methylglutarimide and chromatographical separation of the isomers (silica gel/CHCl$_3$):
3-(2-nitro-3-methoxybenzyl)-3-methylglutarimide,
3-(2-nitro-5-methoxybenzyl)-3-methylglutarimide, and
3-(4-nitro-3-methoxybenzyl)-3-methylglutarimide, m.p. 154°;

and from 3-(2-chloro-5-methoxybenzyl)-3-methylglutarimide, by nitration:
3-(2-chloro-5-methoxy-4-nitrobenzyl)-3-methylglutarimide, m.p. 178°–179° and
3-(6-chloro-3-methoxy-2-nitrobenzyl)-3-methylglutarimide, m.p. 195°–196°.

b. Analogously to Example 4(c), from 3-(2-nitro-5-methoxybenzyl)-3-methylglutarimide, one obtains by hydrogenation:
3-(2-amino-5-methoxybenzyl)-3-methylglutarimide, m.p. 150°–151°.

c. Analogously to Example 4(d), from 3-(2-amino-5-methoxybenzyl)-3-methylglutarimide, by reaction with NaNO$_2$ and Cu$_2$Br$_2$, the following compound is produced:
3-(2-bromo-5-methoxybenzyl)-3-methylglutarimide, m.p. 137°–138°.

d. In analogy to Example 4(e), from 3-(2-amino-5-methoxybenzyl)-3-methylglutarimide, by reaction with paraformaldehyde in HCOOH, the following compound is obtained:
3-(2-dimethylamino-5-methoxybenzyl)-3-methylglutarimide.

e. Analogously to Example 4(g), from 3-(2-amino-5-methoxybenzyl)-3-methylglutarimide, by reaction with NaNO$_2$ and HBF$_4$ and thermal decomposition of the diazonium fluoroborate, the following product is obtained:
3-(2-fluoro-5-methoxybenzyl)-glutarimide.

f. Analogously to Example 4(h), from 3-(2-amino-5-methoxybenzyl)-3-methylglutarimide, by reaction with NaNO$_2$ and HgCl$_2$, as well as thermal decomposition of the organomercury compound, one produces:
3-(2-chloro-5-methoxybenzyl)-3-methylglutarimide, m.p. 126°–127°.

g. In analogy to Example 4(f), from 3-(3-methoxybenzyl)-3-methylglutarimide, by reaction with Br$_2$, the following compound is obtained:
3-(2-bromo-5-methoxybenzyl)-3-methylglutarimide, m.p. 137°–138°.

EXAMPLE 8

An aqueous solution of 3-[2,6-dioxopiperidyl-(4)-methyl]-4-methoxybenzene diazonium hydrogen sulfate (produced by nitration of 2.3 g. of 3-(2-methoxybenzyl)-glutarimide, hydrogenation of the thus-obtained 3-(2-methoxy-5-nitrobenzyl)-glutarimide on a Pd-C catalyst (5%), and diazotization of a sulfuric acid solution of the thus-produced 3-(5-amino-2-methoxybenzyl)-glutarimide with $NaNO_2$) is added to a mixture, heated to 140°, of 50 ml. of concentrated $H_2SO_4$ and 25 ml. of $H_2O$; the reaction mixture is maintained at 140° for 30 minutes, poured into 200 ml. of ice water, neutralized with concentrated aqueous $NaHCO_3$ solution, extracted with ether, dried, the solvent distilled off, and 3-(2-methoxy-5-hydroxybenzyl)-glutarimide is produced in this manner.

EXAMPLE 9

2.5 g. of 3-(2,5-dimethoxybenzyl)-5-valerolactam (obtainable by treatment of anti-3-(2,5-dimethoxybenzyl)-cyclopentanone oxime with $P_2O_5$) is dissolved in 50 ml. of ethyl acetate, cooled to −10°, 10 mg. of manganese (III) acetonylacetonate is added thereto, and 2,4 g. of a 25% strength $CH_3COOOH$ solution in ethyl acetate is added dropwise thereto at −10°. The mixture is stirred until no peroxide is contained therein any more, filtered, the solvent is distilled off, and 3-(2,5-dimethoxybenzyl)-glutarimide is thus produced, m.p. 111°–113°.

EXAMPLE 10

Under a nitrogen atmosphere, 5.2 g. of anhydrous 3-(2,5-dimethoxybenzyl)-glutaric acid mononitrile (obtainable from 1-cyano-3-(2,5-dimethoxyphenylprop-1-ene) and diethyl malonic ester, treatment with cold 10% aqueous NaOH, acidification, and heating) is heated for 2 hours to 140°–150°, recrystallized after cooling from methanol, and 3-(2,5-dimethoxybenzyl)-glutarimide is thus obtained, m.p. 111°–113°.

The preceding examples can be repeated with similar success by substituting the generically or specifically described reactants and/or operating conditions of this invention for those used in the preceding examples.

From the foregoing description, one skilled in the art can easily ascertain the essential characteristics of this invention, and without departing from the spirit and scope thereof, can make various changes and modifications of the invention to adapt it to various usages and conditions.

What is claimed is:

1. A glutaric acid imide of the formula

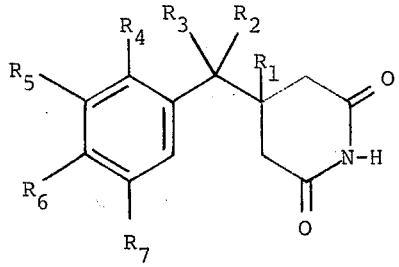

wherein $R_1$, $R_2$ and $R_3$ are H or unbranched alkyl or unbranched alkoxy, each of up to 6 carbon atoms; $R_4$ and $R_6$ are H, halogen, OH, alkoxy of up to 6 carbon atoms, benzyloxy or tetrahydropyranyloxy, $NO_2$, methyl, ethyl, propyl, isopropyl, butyl, isobutyl, sec.butyl, amino, alkylamino, or dialkylamino, each of up to 8 carbon atoms, or alkanoyl of up to 7 carbon atoms; $R_5$ is H, halogen, OH, methyl, ethyl, propyl, isopropyl, butyl, isobutyl, sec.butyl, amino, alkylamino or dialkylamino, each of up to 8 carbon atoms, or alkanoyl of up to 7 carbon atoms; or $R_4$ and $R_5$ or $R_5$ and $R_6$ collectively are —CH=CH—CH=CH—; and $R_7$ is OH, alkoxy of up to 6 carbon atoms, benzyloxy or tetrahydropyranyloxy.

2. A compound of claim 1, wherein $R_1$ is H.

3. A compound of claim 1, wherein $R_1$ is $CH_3$.

4. A compound of claim 1, wherein $R_7$ is OH, $OCH_3$ or $OCH_2C_6H_5$.

5. A compound of claim 2, wherein $R_7$ is OH, $OCH_3$ or $OCH_2C_6H_5$.

6. A compound of claim 3, wherein $R_7$ is OH, $OCH_3$ or $OCH_2C_6H_5$.

7. A compound of claim 5, wherein $R_4$ is $OCH_3$.

8. The compound of claim 1, 3-(2-Chloro-5-methoxybenzyl)-3-n-propylglutarimide.

9. The compound of claim 1, 3-(α-Naphthylmethyl)-glutarimide.

10. The compound of claim 1, 3-(2,5-Dimethoxybenzyl)-glutarimide.

11. The compound of claim 1, 3-(2-Chloro-5-methoxybenzyl)-glutarimide.

12. The compound of claim 1, 3-(2,5-Dimethoxybenzyl)-3-methylglutarimide.

13. The compound of claim 1, 3-(2-Chloro-5-methoxybenzyl)-3-methylglutarimide.

* * * * *